Nov. 6, 1962 R. E. COBURN 3,062,566

MANIFOLD ATTACHMENT TO TUBULAR WALL

Filed June 25, 1959

INVENTOR
ROBERT E. COBURN

BY Charles A. Warren
ATTORNEY

United States Patent Office 3,062,566
Patented Nov. 6, 1962

3,062,566
MANIFOLD ATTACHMENT TO TUBULAR WALL
Robert E. Coburn, Warehouse Point, Conn., assignor to United Aircraft Corporation, East Hartford, Conn., a corporation of Delaware
Filed June 25, 1959, Ser. No. 822,929
1 Claim. (Cl. 285—137)

This invention relates to an attachment between a set of tubes and a manifold extending transversely of the tubes and is particularly useful in a rocket combustion chamber or nozzle.

The use of axially extending tubes forming the wall of a combustion chamber or a nozzle is well-known, one environment being described in a co-pending application of Newcomb et al., Serial No. 813,801, filed May 18, 1959, having the same assignee as the present application. For effective coolant circulation in the tubes, a manifold must be attached to the tubes with a fluid tight connection to withstand the pressures within the manifold and tubes. One feature of the present invention is the attachment of a set of tubes to a manifold extending transversely of the tubes to assure a leak-proof connection and to minimize the points between the tubes and manifold.

Another feature is an assembly of this connection, the joints of which are easily inspected for leakage. Another feature is a method of assembly of the manifold and tubes.

Other features and advantages will be apparent from the specification and claims, and from the accompanying drawing which illustrates an embodiment of the invention.

Figure 1:
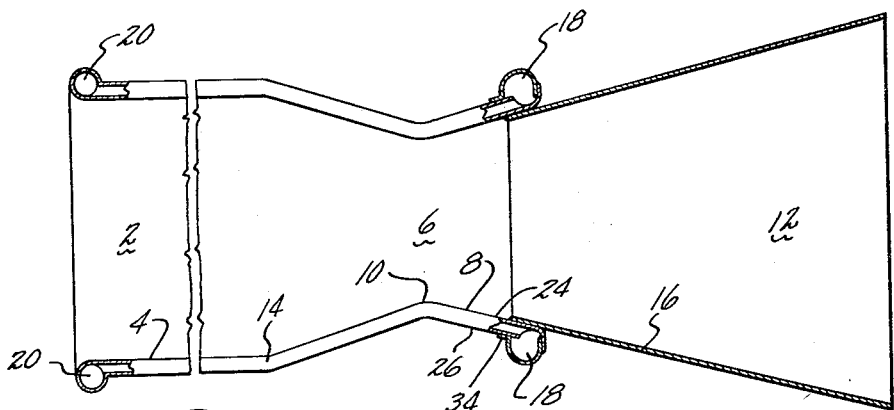
FIG. 1 is a longitudinal sectional view through a nozzle and chamber embodying the invention.
Figure 2:
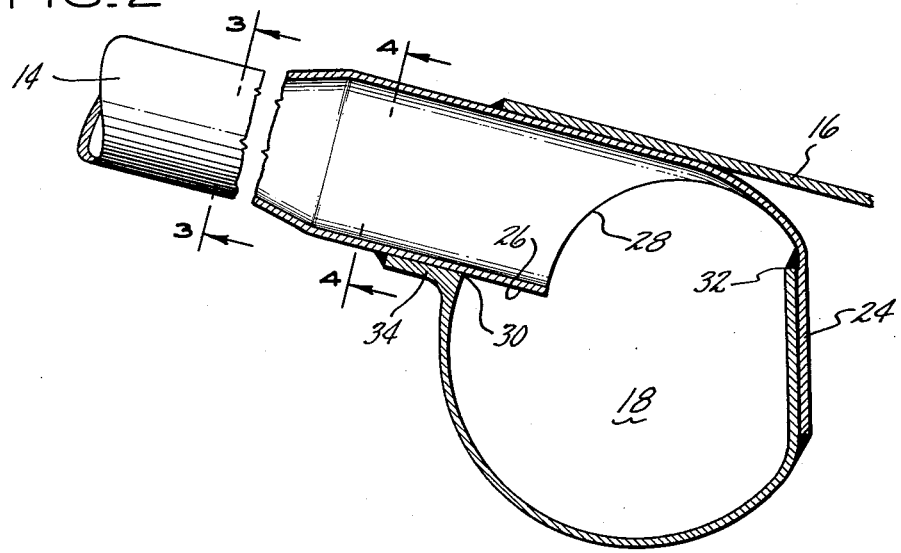
FIG. 2 is an enlarged fragmentary view of a portion of FIG. 1, showing further details.
Figure 3:
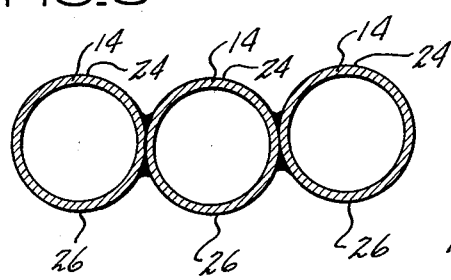
FIG. 3 is a sectional view substantially along the line 3—3 of FIG. 2.

The invention is shown in a rocket construction having a rocket chamber 2 surrounded by a wall 4 and a nozzle 6 positioned on the end of the chamber 2. The wall 8 of the nozzle forms an extension of the wall 4 of the chamber. The opposite sides of the wall 8 of the nozzle converge from the combustion chamber wall 4 to form a throat 10 and then the opposite walls diverge to form the discharge portion 12 of the nozzle.

The chamber wall is made up of a plurality of axially extending tubes 14 which extend beyond the chamber to form a portion of the nozzle wall, as shown in FIG. 1. Beyond the ends of the tubes 14 the nozzle may be made up of a single sheet thickness of material 16. The tubes 14 may be tapered to accommodate the decrease in diameter as the tubes approach the throat of the nozzle. Alternatively, the tubes may be flattened radially or circumferentially in order to occupy the same sector of the nozzle wall regardless of the nozzle diameter.

Figure 4:
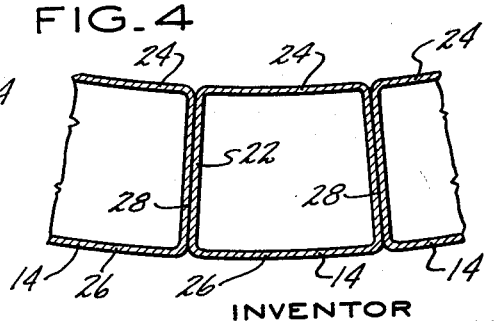
FIG. 4 is a sectional view substantially along the line 4—4 of FIG. 2.

The ends of the several tubes 14 may be connected together by a manifold 18 at their downstream ends and by a similar manifold 20 at their upstream ends. To accomplish a leak-proof connection between each of the tubes and the manifold, the several tubes 14, all of which approach the manifold 18 at substantially the same angle and in substantially parallel relation, have their ends flared into a nearly sector-shape, FIG. 4, such that the several tube ends 22 will be in side-by-side contact. As used herein, the term "sector-shape" is used to define the tube ends as they appear in FIG. 4 and wherein radially extending side partitions 28 abut and are joined to corresponding partitions in adjacent tubes and extend between inner wall 24 and outer wall 26 of each tube. The inner walls 24 and outer walls 26 are shaped to define a smooth surface of circular cross section. The tube ends are brazed or otherwise securely attached together thereby producing an inner or top wall 24 and an outer or bottom wall 26 with these walls connected together by partitions 28.

The inner wall 24, as will be apparent, forms the inner exposed surface of the rocket or nozzle wall and is made up of the inner end surfaces of the several tube ends. Similarly, the outer or bottom wall 26 is made up of the outer surfaces of the several tubes and the partitions are defined by the contacting side surfaces of adjacent tubes. The tube ends 22 are, in fact, sector-shape although as the number of tubes increases in the chamber wall, these tube ends will approach a square or rectangular shape, as will be apparent.

The outer wall 26, after the tube ends are brazed together, is cut back such that this wall is shorter lengthwise of the tubes than the inner wall 24 and the partitions 28 are also cut back to leave the projecting end of the inner wall 24 free to be bent up at a substantial angle to the axis of the tubes 14.

The manifold 18 is in the form of a ring with a longitudinal slot formed therein to provide opposite edges 30 and 32 of the slot and the manifold adjacent to the edges 30 and 32 is attached to the tubes. To accomplish this, the manifold 18 adjacent the edge 30 of the slot has a flange 34 which engages with and is securely brazed or welded to the outer wall surface 26 at a point adjacent to the end of the outer wall 26. The portion of the manifold 18 adjacent to the slot edge 32 may be flattened and positioned in overlapping relation to the bent up portion of the inner wall 24 and is securely brazed or welded thereto.

With this arrangement, it is possible to inspect the brazed joint between adjacent tube ends, as will be apparent, prior to the attachment of the manifold 18 and the attachments of the manifold to the tubes is such that these attachments may also be inspected for leakage. In addition, the arrangement of the parts is such that any bursting pressures acting on the tubes and manifold as a result of the fluid pressures therein will be uniformally distributed to the inner and outer walls 24 and 26.

In assembling the manifold to the tubes, one method for so doing is to flare all of the tubes where they are to join the manifold into sector shapes with each sector occupying the same angular sector of the nozzle periphery as do the tubes 14 such that adjacent sector shapes are in contact. These sector shapes are then brazed together to form an elongated slot having an inner or top wall 24, an outer or bottom wall 26 and partitions 28 between the inner and outer walls. The outer wall and the partitions are then machined back from the ends of the slot so that the outer wall is substantially shorter than the inner wall and the manifold, which has a slot longitudinally thereof is then attached to the top and bottom walls along the edges of the slot in the manifold. It is preferable to provide a flange on the manifold adjacent to one edge of the slot for attachment to the outer wall 26 and it is preferable to overlap the manifold adjacent the other edge of the slot with the inner wall 24 for attachment of this inner wall to the manifold.

It is to be understood that the invention is not limited to the specific embodiment herein illustrated and described, but may be used in other ways without departure from its spirit as defined by the following claims.

I claim:

A duct system for use in a rocket motor including a combustion chamber at its forward end and an exhaust gas expansion chamber at its rearward end connected to and positioned to receive the products of combustion from said combustion chamber, a tapered duct defining at least a portion of said exhaust gas expansion chamber and having a forward end adjacent said combustion chamber, a hollow ring propellant manifold of substantially arcuate cross section surrounding said forward end of said tapered duct, a ring of hollow tubes positioned and joined in side-by-side parallel relation to form a wall of passages enveloping and defining said combustion chamber, each of said tubes having an open end circumferentially juxtapositioned to the corresponding open end of the adjacent tubes so that all open tube ends extend beyond the forward end of said duct substantially the same distance, each of said tubes being sector-shaped adjacent said open end and having substantially radially extending side partitions and radially spaced inner and outer walls joined to said side partitions to define an elongated tube therewith and with said side partitions joined to the abutting side partitions of adjacent tubes and with said outer and inner walls shaped to form a substantially smooth wall of circular cross section with the corresponding inner and outer walls of all other tubes, said inner wall of each of said tubes extending substantially beyond the outer wall thereof and also extending rearwardly a substantial distance beyond and attached to said tapered duct forward end so as to lie in a plane substantially normal to said duct wall and passing through both inner and outer walls of each respective tube, said inner wall extensions being bent outwardly beyond said outer wall in cantilever fashion and to a cross-sectional shape of a portion of a circle and culminating in a free end, and a hollow ring having a cross-sectional shape defining a sector of a circle with curvature corresponding to said circular inner wall extensions and positioned to circumferentially envelop said tube open ends and having an after edge overlapping and attached to said free end of said tube inner wall extensions and also having a ring flange projecting from its forward edge and enveloping and attached to the exterior of said substantially smooth wall formed by said tube outer walls to thereby coact with said tube open ends to form said hollow ring manifold of substantially circular cross section communicating with the interior of said hollow tubes.

References Cited in the file of this patent

UNITED STATES PATENTS

| | | |
|---|---|---|
| 1,581,571 | Frederickson | Apr. 20, 1926 |
| 2,064,539 | Hart | Dec. 15, 1936 |
| 2,669,835 | Rassheim et al. | Feb. 23, 1954 |
| 2,880,577 | Halford et al. | Apr. 7, 1959 |
| 2,958,183 | Singelmann | Nov. 1, 1960 |

FOREIGN PATENTS

| | | |
|---|---|---|
| 896,089 | France | Apr. 17, 1944 |
| 809,844 | Britain | Mar. 4, 1959 |